(12) United States Patent
Jia et al.

(10) Patent No.: US 10,846,301 B1
(45) Date of Patent: Nov. 24, 2020

(54) CONTAINER RECLAMATION USING PROBABILISTIC DATA STRUCTURES

(71) Applicant: Veritas Technologies LLC, Mountain View, CA (US)

(72) Inventors: Yingsong Jia, Beijing (CN); Xin Wang, Sichuan (CN); Guangbin Zhang, Beijing (CN)

(73) Assignee: Veritas Technologies LLC, Santa Clara, CA (US)

( * ) Notice: Subject to any disclaimer, the term of this patent is extended or adjusted under 35 U.S.C. 154(b) by 369 days.

(21) Appl. No.: 15/445,113

(22) Filed: Feb. 28, 2017

(51) Int. Cl.
*G06F 16/27* (2019.01)
*G06F 17/18* (2006.01)
*G06F 16/22* (2019.01)

(52) U.S. Cl.
CPC .............. *G06F 16/27* (2019.01); *G06F 16/22* (2019.01); *G06F 17/18* (2013.01)

(58) Field of Classification Search
CPC ............... G06F 3/0641; G06F 16/1748; G06F 11/1453; G06F 2201/81; G06F 16/1752; Y02D 10/34; H03M 7/3091
See application file for complete search history.

(56) References Cited

U.S. PATENT DOCUMENTS

| | | | | |
|---|---|---|---|---|
| 8,700,578 B1* | 4/2014 | Varadan | ................ | G06F 16/174 707/692 |
| 9,634,992 B1* | 4/2017 | Rostamabadi | ...... | G06F 16/9535 707/692 |
| 2009/0112949 A1* | 4/2009 | Ergan | .................. | G06F 12/0802 707/999.205 |
| 2011/0307447 A1* | 12/2011 | Sabaa | .................. | H04L 67/2842 707/637 |
| 2012/0159098 A1* | 6/2012 | Cheung | ............... | G06F 12/0261 711/162 |
| 2014/0244599 A1* | 8/2014 | Zhang | ................... | G06F 3/0608 707/692 |

OTHER PUBLICATIONS

Cao, Pei. "Bloom Filters—the math,"http://pages.cs.wise.edu/~cao/papers/summary-cache/node8.html, Jul. 5, 1998, 6 pages.

\* cited by examiner

*Primary Examiner* — Yuk Ting Choi
(74) *Attorney, Agent, or Firm* — Campbell Stephenson LLP

(57) ABSTRACT

Disclosed herein are methods, systems, and processes to perform container reclamation using probabilistic data structures. A hash value associated with a data segment and stored in a data container is received. Elements in a probabilistic data structure are identified using one or more portions of the hash value and element values are determined for each element. In response to a determination that the element values indicate that the segment object should be maintained, the segment object is maintained during compaction of the data container.

20 Claims, 15 Drawing Sheets

| | Probabilistic Data Structure Size Calculator 305 | | | |
|---|---|---|---|---|
| File Size 310 (8K/128K) | Probabilistic Data Structure Size 315 | Hash Functions 320 | Hit Ratio % 325 | Deletion Efficiency 330 |
| 32MB/512MB | 8388608 (1MB) | 7 | 100 | High |
| 8GB/128GB | | | 97.7 | — |
| 64GB/1TB | | | 0.63 | Low |
| 1TB/16TB | | | 0 | |
| 32MB/512MB | 67108864 (8MB) | | 100 | High |
| 8GB/1TB | | | 100 | — |
| 64GB/1TB | | | 97.7 | Low |
| 1TB/16TB | | | 0 | |
| 32MB/512MB | 1073741824 (128MB) | | 100 | High |
| 8GB/128GB | | | 100 | — |
| 64GB/1TB | | | 100 | Low |
| 1TB/16TB | | | 97.7 | |
| Results 335 | Hash function count = 7; Fingerprint/bit size = 8 → Hit ratio = 97%; false negative = 0 | | | |

CONTAINER RECLAMATION USING PROBABILISTIC DATA STRUCTURES

FIELD OF THE DISCLOSURE

The present disclosure relates to data storage. In particular, this disclosure relates to data container reclamation using probabilistic data structures in data storage environments.

DESCRIPTION OF THE RELATED ART

Data deduplication (or more simply, deduplication) is a process that eliminates redundant copies of data and reduces storage overhead. Deduplication ensures that only one unique instance of data is retained on a storage device. Redundant data blocks are replaced with a pointer to the unique data copy. Source-based deduplication (also called client-side deduplication) removes redundant blocks before transmitting data to a backup target such as a storage device. Performing deduplication at the source reduces bandwidth and storage use.

Deduplication involves linking multiple references to the same data content. Although each data segment may be referenced by more than one backup image, storage reclamation can remove data segments if associated backups have expired. For example, free space in the storage device (e.g., data containers) can be compacted to reclaim storage space newly made available, for example, as a result of deduplication.

Existing data compaction (or more simply, compaction) mechanisms require in-memory comparison between a segment object fingerprint associated with a segment object in a data container and information contained in a segment object list that that can be used to determine if the segment object fingerprint is referenced by one or more data objects stored on disk. Unfortunately, a typical segment object list can be quite large in size and can take up a significant amount of valuable memory space at runtime as well as storage space on disk. Performing compaction to reclaim storage space in this manner is slow, inefficient, resource intensive, and undesirable.

SUMMARY OF THE DISCLOSURE

Disclosed herein are methods, systems, and processes to perform container compaction using probabilistic data structures. One such method involves receiving a hash value. In this example, the hash value is associated with a segment object, and the segment object is stored in a data container. The method identifies elements in a probabilistic data structure using portions of the hash value, and determines element values by determining an element value for each of the elements. In response to a determination that the element values indicate that the segment object should be maintained, the method maintains the segment object during compaction of the data container.

In some embodiments, compaction of the data container includes maintaining another segment object during the compacting if the element value for each of the elements in the probabilistic data structure is one, and permitting compaction of the another segment object during the compacting if the element value for at least one element of the elements is zero. In other embodiments, the method determines a size of the probabilistic data structure based on determining that a portion of the hash value results in a false positive rate associated with the segment object, where the false positive rate indicates that a hit ratio percentage meets or exceeds a deletion efficiency threshold.

In certain embodiments, the method creates the probabilistic data structure prior to compaction of the data container by accessing the portion of the hash value, and setting one or more bit values that the portion of the hash value indicates in the probabilistic data structure. In certain other embodiments, the method determines a false positive rate associated with the probabilistic data structure, where the false positive rate is a function of the size of the probabilistic data structure, a hash function count, and a fingerprint size, and determines a false negative rate associated with the probabilistic data structure, where the hit ratio percentage meets or exceeds the deletion efficiency threshold if the false negative rate is zero. In some embodiments, the segment object is included in a data object, and the probabilistic data structure is associated with the data object. In one embodiment, the probabilistic data structure is a Bloom filter bitmap. In another embodiment, the hash value is a fingerprint.

The foregoing is a summary and thus contains, by necessity, simplifications, generalizations and omissions of detail; consequently those skilled in the art will appreciate that the summary is illustrative only and is not intended to be in any limiting. Other aspects, features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features and advantages made apparent to those skilled in the art by referencing the accompanying drawings.

FIG. 3D is a block diagram 300D of a probabilistic data structure size calculator, according to one embodiment of the present disclosure.

Figure 1:
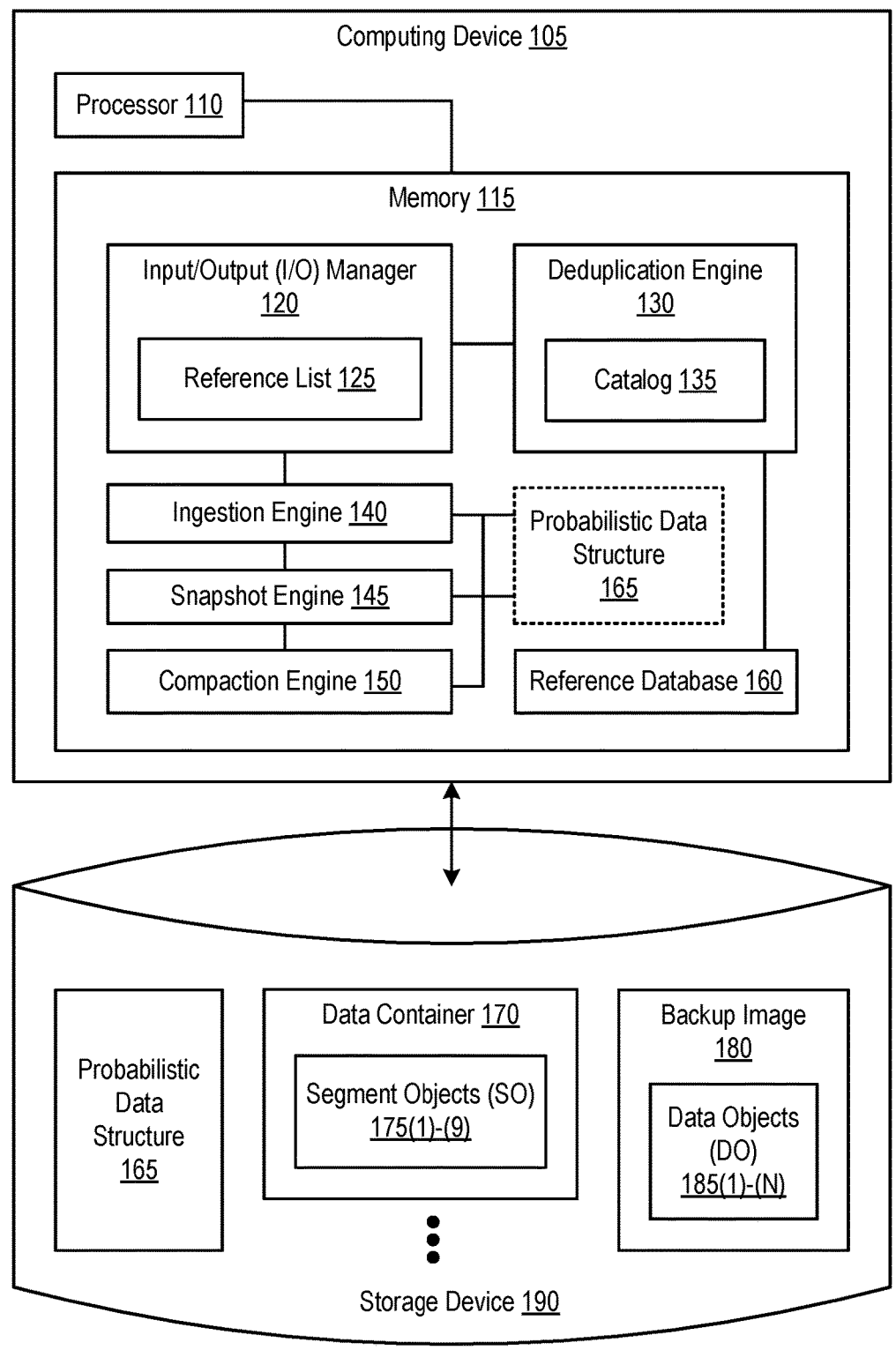
FIG. 1 is a block diagram 100 of a computing device that performs data compaction using a probabilistic data structure, according to one embodiment of the present disclosure.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Introduction

A fingerprinting algorithm is an algorithm that maps a larger data item (e.g., a computer file, data segment, or other unit of data) to a smaller value. The smaller value is sometimes referred a "hash value" of the data item (e.g., in the case of a deduplication storage system, a "fingerprint"). It should be noted that the terms "fingerprint" and "hash value" are used interchangeably in the present disclosure. The hash value identifies the data item in a significantly unique manner. During a backup, clients and/or computing systems can duplicate data within a set of data to be backed up. In addition, if a set of data is backed up multiple times, data that is unchanged or unmodified also results in duplicates of previously backed up data.

As previously noted, in order to prevent backing up duplicate data from one or more clients, backup systems can implement deduplication, which is a process for removing duplicate and/or redundant copies of data from a storage device. Deduplication preserves storage space when backing up data from client systems (e.g., using client-side or source-side deduplication). Because deduplication ensures that only one unique instance of data is retained on a storage device, deduplication reduces bandwidth and storage use.

Hash values or fingerprints may be used for deduplication purposes to avoid the need for comparison and transmission of excessive amounts of data. For example, backup servers can check whether a file has been modified by retrieving only the file's hash value (instead of the entire file), and comparing the retrieved hash value with that of a previously-retrieved copy of the file. Thus, matching hash values, or portions of hash values, in such a situation obviates the need to transfer the files. A hash value can also be a value generated for a given data segment. Typically, such hash values are unique to each data segment, and thus distinguish data segments from one another. A hash value is an example implementation of a fingerprint. For example, hashing algorithms (also called fingerprinting algorithms) such as Rabin's Algorithm, Message-Digest Algorithm 5 (MD5), and Secure Hash Algorithm 512 (SHA-512), and the like, can be used to generate hash values.

As previously noted, storage space preserved and/or saved using deduplication can be reclaimed after backups associated with certain data segments have expired. Data containers in storage devices that store deduplicated data (also called deduplication data stores) can be compacted to reclaim storage space. As previously noted, existing compaction (or mechanisms, systems, and/or methodologies) require in-memory comparison between a segment object fingerprint associated with a segment object in a data container, and information contained in a segment object list that that can be used to determine if the segment object fingerprint is referenced by one or more data objects stored on disk.

A segment object list includes segment object fingerprints for multiple segment objects in a data container (or more simply, container). Therefore, although a segment object list can be used to definitively determine whether a given segment object should be maintained on the storage device or compacted, such definitiveness comes at a steep price in terms of negative impacts on computing resources because a segment object list can be quite large in size and can take up a significant amount of valuable memory space at run-time as well as storage space on disk. For large files and in large scale storage environments, the increased memory footprint as a result of using a segment object list for performing container compaction is undesirable. In addition, segment object list comparison-based compaction involves loading multiple data objects from disk to memory, and is time and computing resource intensive. Performing compaction to reclaim storage space in this manner is inefficient.

Disclosed herein are methods, systems, and processes to perform container reclamation using probabilistic data structures for compaction operations. In addition to other advantages, it will be appreciated that the methods, systems, and processes disclosed herein can at least: (1) load the requisite identifying information from a storage device faster than existing and previous compaction mechanisms because the size of a probabilistic data structure is much smaller than that of a segment object list, (2) decrease memory footprint by using the probabilistic data structure for storage reclamation, thus making valuable memory resources available to other computing tasks, and (3) reduce storage space usage on disk (e.g., a storage device). In addition, a segment object fingerprint value can be reused as a hash value for the probabilistic data structure, thus not requiring calculation of any additional or alternate values.

Example Systems to Reclaim Containers Using Probabilistic Data Structures

FIG. 1 is a block diagram 100 of a computing device that performs data compaction using a probabilistic data structure, according to one embodiment. Computing device 105 includes a processor 110 and a memory 115. Computing device 105 can be any of a variety of different types of computing devices, including a server, personal computing device, laptop computer, cellular phone, or the like. Memory 115 implements an input/output (I/O) manager 120. I/O manager 120 configures and manages I/O operations (e.g., read operations and/or write operations) related to data that is stored, and/or is requested to be stored, on storage device 190 (e.g., using reference list 125).

Storage device 190 can include one or more of a variety of different storage devices, including hard disks, compact discs, digital versatile discs, one or more solid state drives (SSDs) memory such as Hash memory, and the like, or one or more logical storage devices such as volumes implemented on one or more such physical storage devices. Any type of network and/or interconnection (e.g., the Internet, and the like) can be used to facilitate communication between computing device 105 and storage device 190.

Memory 115 also implements an ingestion engine 140, a snapshot engine 145, a compaction engine 150, a deduplication engine 130, and a reference database 160. Deduplication engine 130 includes a catalog 135. Catalog 135 maintains metadata information regarding one or more deduplication operations (e.g., the identity and location of deduplicated data, and the like). Reference database 160 maintains information about the deduplicated data (e.g., pointer information, reference information, and other such metadata).

Storage device 190 includes a probabilistic data structure 165, a data container 170 with segment objects (SOs) 175(1)-(9), and a backup image 180 with data objects (DOs) 185(1)-(N). It should be noted that storage device 190 can store more than one backup image. In one embodiment, probabilistic data structure 165 is copied from storage device 190 to memory 115 as part of performing one or more compaction operations. Therefore, probabilistic data structure 165 is shown with dotted lines in memory 115.

Figure 2A:
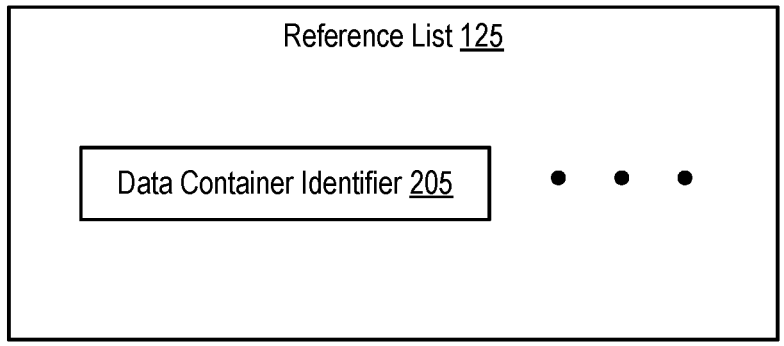
FIG. 2A is a block diagram 200A of a reference list, according to one embodiment of the present disclosure.

FIG. 2A is a block diagram 200A of a reference list, according to one embodiment. I/O manager 120 maintains reference list 125. Reference list 125 includes at least a data container identifier 205. Data container identifier 205 is associated with and can be used to identify data container 170 that is stored in storage device 175. Therefore, reference list 215 can be used by I/O manager 120 to locate and identify one or more containers stored in storage device 175.

Figure 2B:
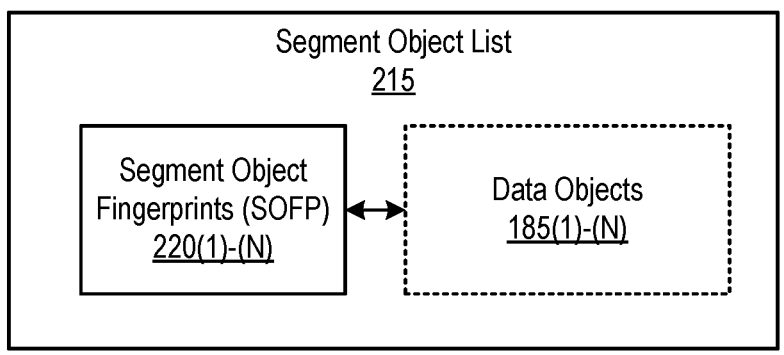
FIG. 2B is a block diagram 200B of a segment object list, according to one embodiment of the present disclosure.

FIG. 2B is a block diagram 200B of a segment object list, according to one embodiment. A segment object list 215 is a data structure that can be used to perform compaction to reclaim containers in deduplication storage environments. As shown in FIG. 2B, segment object list 215 includes one or more segment object fingerprints (SOFPs) (e.g., SOFPs 220(1)-(N)) that permit identification of one or more data objects associated with those SOFPs (e.g., data objects 185(1)-(N) shown in dotted lines). Unfortunately, and as previously noted, given its size, using a segment object list for container reclamation is undesirable.

Figure 2C:
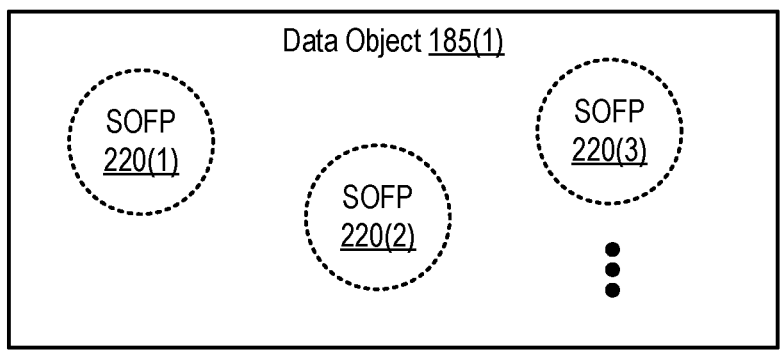
FIG. 2C is a block diagram 200C of a data object, according to one embodiment of the present disclosure.

FIG. 2C is a block diagram 200C of a data object, according to one embodiment. A data object is a representation of data that is stored on a storage device. Data is typically stored in data blocks (or more simply, blocks). One block corresponds to a specific number of bytes of physical storage space on disk. An extent is a specific number of contiguous blocks. A data segment (or more simply, segment) is a set of extents, and thus, a set of blocks. A block can be associated with multiple segments, especially if that block has been deduplicated and the block is referenced by different segments on different backup images. Therefore, a given data object like data object 185(1) as shown in FIG. 2C can be associated with (and referenced by) multiple segment (object) fingerprints (e.g., SOFPs 220(1), 220(2), and 220(3), shown in dotted lines).

Figure 2D:
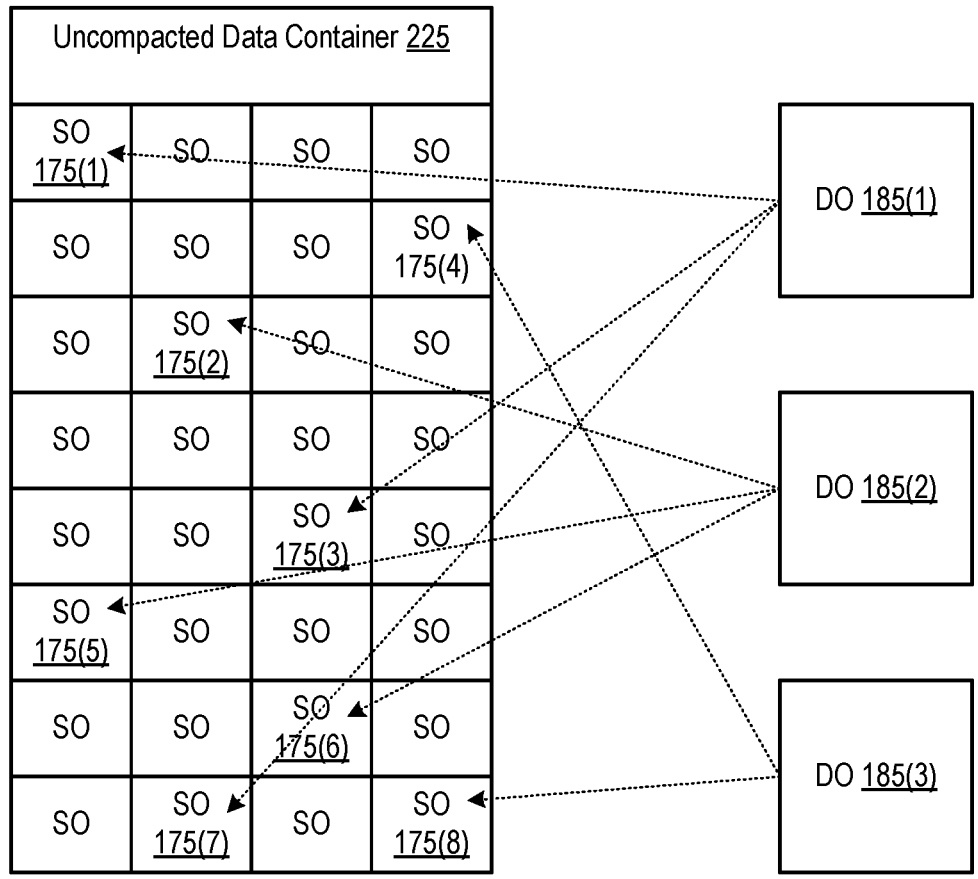
FIG. 2D is a block diagram 200D of an uncompacted data container, according to one embodiment of the present disclosure.

FIG. 2D is a block diagram 200D of an uncompacted data container, according to one embodiment. SOs 175(1)-(8) in uncompacted data container 225 are segment objects that are currently referenced by DOs 185(1)-(3). Uncompacted data container 225 can be compacted to reclaim storage space because the other segment objects (without numbers) are not referenced by any DOs and are thus not in use (e.g., stale data), and/or are part of expired backup images.

Figure 2E:
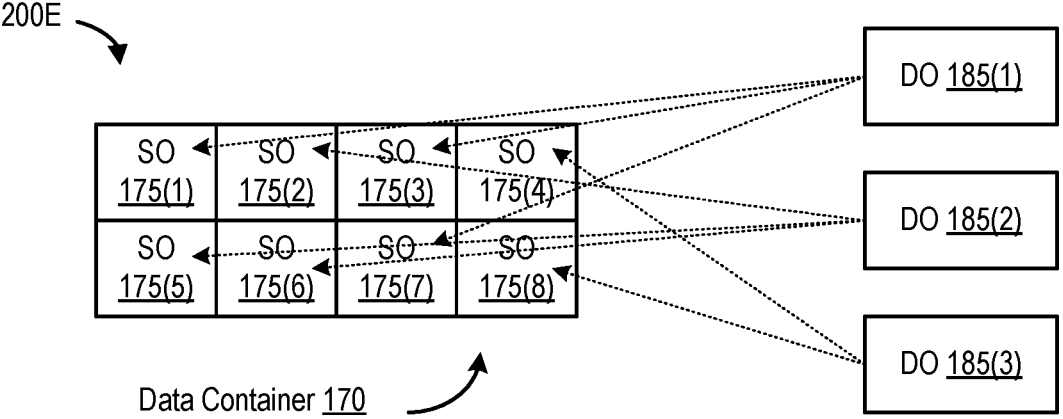
FIG. 2E is a block diagram 200E of a compacted data container, according to one embodiment of the present disclosure.

FIG. 2E is a block diagram 200E of a compacted data container, according to one embodiment. As shown in FIG. 2E, uncompacted data container 225 of FIG. 2D has been compacted (e.g., data container 170), and storage space from extraneous segment objects has been reclaimed. After compaction, data container 170 only includes SOs 175(1)-(8) and each of SOs 175(1)-(8) is referenced and required by at least one DO. However, it should be noted that performing a compaction operation described in FIGS. 2D and 2E using a segment object list is undesirable for at least the previously-discussed reasons.

Figure 2F:
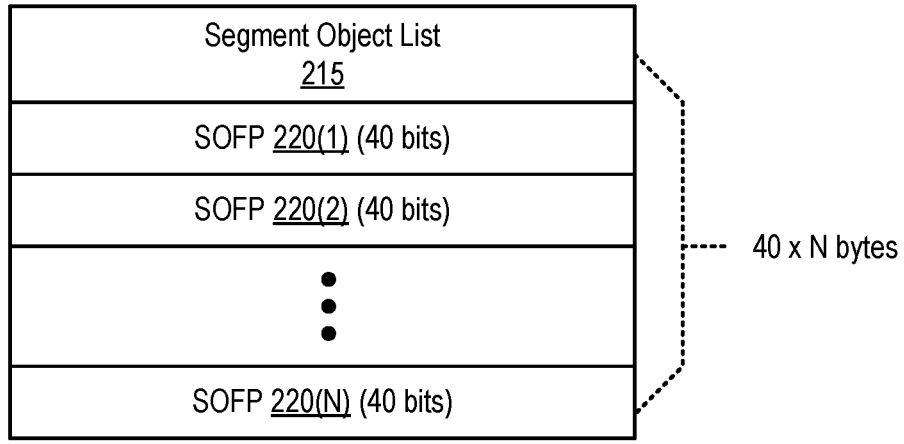
FIG. 2F is a block diagram 200F of a segment object list, according to one embodiment of the present disclosure.

FIG. 2F is a block diagram 200F of a segment object list, according to one embodiment. Segment object list 215 includes segment object fingerprints for segment objects that are part of a container. For example, and as shown in FIG. 2F, segment object list 215 includes SOFP 220(1) (the segment object fingerprint for SO 175(1)), SOFT 220(2) (the segment object fingerprint for SO 175(2)), and so on. Segment object fingerprints maintained and provisioned in this manner for compaction operations can be large in size and can consume large amounts of memory space (e.g., 40×N bytes). In certain deduplication data store configurations, a segment object list can be as large as 320 MB (e.g., 1 TB/128 KB*40 bits). Therefore, if segment objects in a given data container reference, for example, 100 data objects, a compaction thread would need to load those 100 data objects from disk to memory (e.g., one by one). Therefore, it will be appreciated that performing compaction in this manner is computing resource intensive.

Examples of Probabilistic Data Structures

Figure 2G:
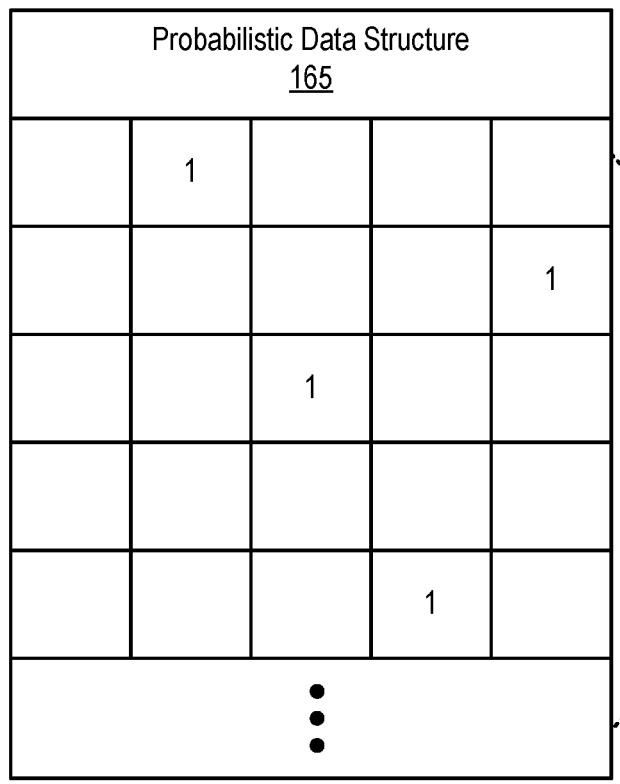
FIG. 2G is a block diagram 200G of a probabilistic data structure, according to one embodiment of the present disclosure.

FIG. 2G is a block diagram 200G of a probabilistic data structure, according to one embodiment. Probabilistic data structure 165, first introduced in FIG. 1, is a space-efficient probabilistic data structure that can be used to determine whether an element is a member of a set. If probabilistic data structure 165 returns "false," the element is definitely not in the set, and if probabilistic data structure 165 returns "true," the element is probably in the set. The false positive rate is a function of the size of probabilistic data structure 165, and the number and independence (e.g., uniqueness) of hash values (or portions thereof) used.

As shown in FIG. 2G, probabilistic data structure 165 includes bit positions 230(1)-(N). For example, a bit position of 1 indicates that a given segment object fingerprint matches a given segment object that is stored in a container and is represented in probabilistic data structure 165 (and thus, the segment object must be maintained during compaction). Conversely, a bit position of 0 indicates that a given segment object fingerprint does not match a segment object that is stored in a container and is represented in probabilistic data structure 165 (and thus, the segment object need not be maintained during compaction).

In certain embodiments, probabilistic data structure 165 is considerably smaller in size compared to a comparable segment object list (e.g., only 2 bits×N bytes). Therefore, it will be appreciated that probabilistic data structure 165 can be used instead of segment object list 215 to perform one or more compaction operations to reclaim containers in computing environments that implement deduplication data stores. If a segment object fingerprint (e.g., SOFP) is compared to probabilistic data structure 165 to determine if the segment object associated with the segment object fingerprint is referenced by one or more data objects, probabilistic data structure 165 can be used to determine that: (1) a given segment object is definitely not being referenced by a data object and can be reclaimed during compaction, or (2) a given segment object is probably being referenced by a data object and should be maintained (e.g., not reclaimed during compaction). In one embodiment, probabilistic data structure 165 is a Bloom filter bitmap, or comparable probabilistic data structure.

Figure 2H:
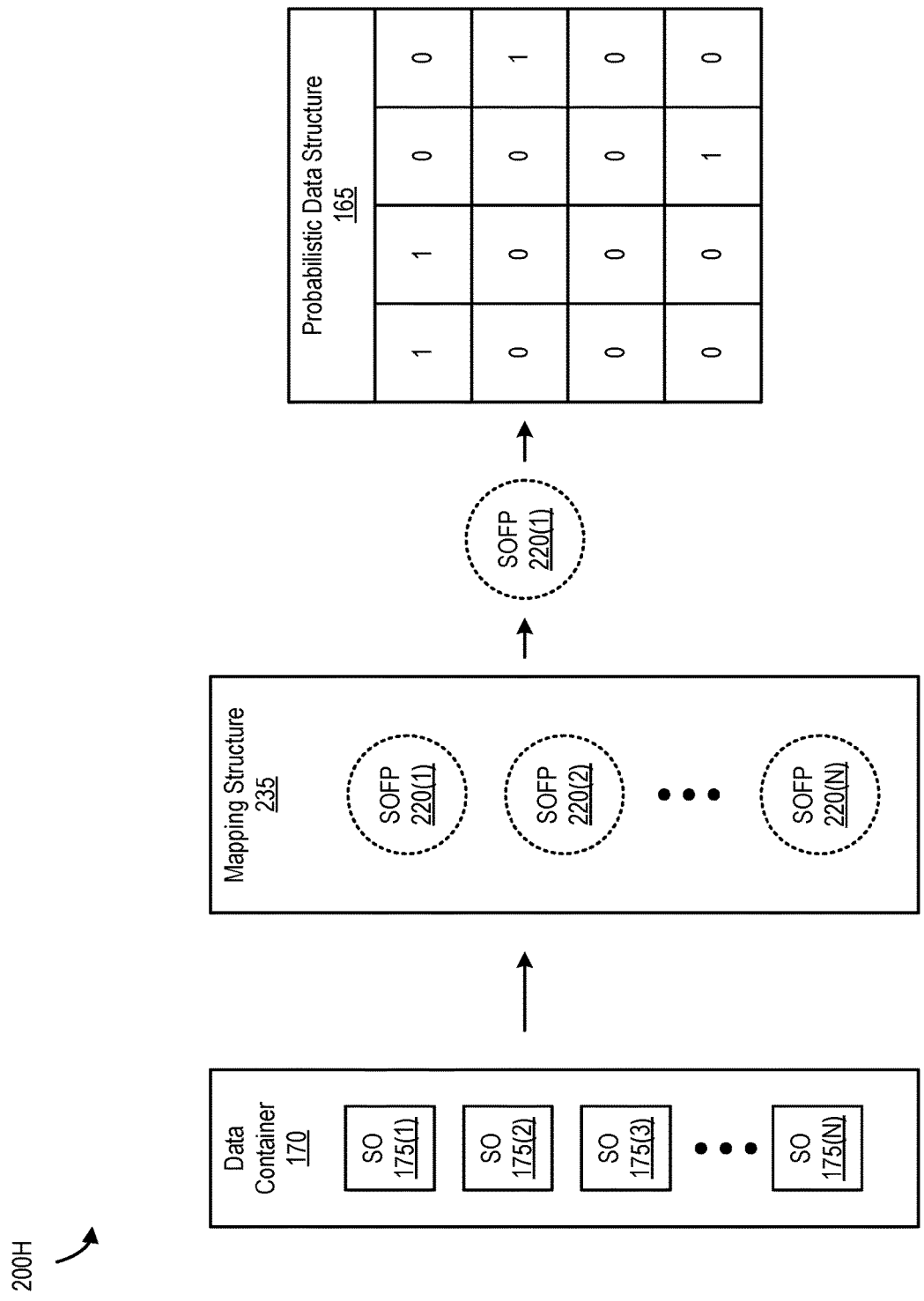
FIG. 2H is a block diagram 200H of a data container, a mapping structure, and a probabilistic data structure, according to one embodiment of the present disclosure.

FIG. 2H is a block diagram 200H of a data container, a mapping structure, and a probabilistic data structure, according to one embodiment. As shown in FIG. 2H, data container 170 includes SOs 175(1)-(N). Mapping structure 235 (e.g., a data change map) includes SOFPs 220(1)-(N). Probabilistic data structure 165, when searched using SOFP 220(1), which in this example corresponds to SO 175(1), can be used to determine whether SO 175(1) should be maintained or not maintained as part of a compaction operation. Based on the size probabilistic data structure 165, and the number and uniqueness of hash values (or portions thereof) used (e.g., SOFPs), a determination can be made as to whether to maintain SO 175(1) during compaction (e.g., based on a false positive rate that is acceptable and/or satisfactory).

Examples of Performing Compaction Using Probabilistic Data Structures

In one embodiment, ingestion engine 140 receives a hash value (e.g., one or more portions of a SOFP) that is associated with a SO (e.g., SO 175(1)) and stores the SO in a data container (e.g., data container 170). Compaction engine 150 identifies elements (e.g., bit values in bit positions as shown in FIG. 2G) in a probabilistic data structure (e.g., probabilistic data structure 165) using one or more portions of the hash value and determines element values by determining an element value (e.g., 0 or 1) for each of the elements in probabilistic data structure 165. In response to a determination that the element values indicate that the SO should be maintained, compaction engine 150 maintains the SO during compaction of data container 170.

In some embodiments, compaction of data container 170 includes maintaining another SO during the compacting if the element value (e.g., bit value) for each of the elements in probabilistic data structure 165 is 1 (probably in the set of SOFPs identifying SOs to be maintained), and permitting compaction of the another segment object during the compacting if the element value (e.g., bit value) for at least one element is 0 (the given fingerprint is not in the set of SOFPs for SOs that are to be maintained). In other embodiments, compaction engine 150 determines a size of probabilistic data structure 165 based on determining that a portion of the hash value results in a false positive rate associated with the SO. The false positive rate indicates that a hit ratio percentage meets or exceeds a deletion efficiently threshold.

In certain embodiments, compaction engine 150 creates probabilistic data structure 165 prior to compaction of a container by accessing a portion of a hash value (e.g., a portion of SOFP 220(1)), and setting one or more bit values (e.g., 0s and 1s) that the portion of the hash value indicates in probabilistic data structure 165. It will be appreciated that because probabilistic data structure 165 cannot determined with 100% certainty that a given SO should be maintained, compaction engine 150 determines a false positive rate associated with probabilistic data structure 165. In this example, the false positive rate is a function of the size of probabilistic data structure 165, a hash function count (e.g., the number of portions of a given hash value used), and a fingerprint size (e.g., a hash value size).

In one embodiment, compaction engine 150 also determines a false negative rate associated with probabilistic data structure 165. In this example, a hit ratio percentage meets (e.g., the ratio of segment objects that are correctly determined to be represented in probabilistic data structure 165 versus those that are incorrectly determined to be represented in probabilistic data structure 165) meets or exceeds a deletion efficiency threshold (e.g., whether valid data is not being maintained beyond a certain acceptable threshold) if the false negative rate is 0. In certain embodiments, an SO is included in a DO, probabilistic data structure 165 is associated with a DO, and probabilistic data structure 165 is a Bloom filter bitmap.

Figure 3A:
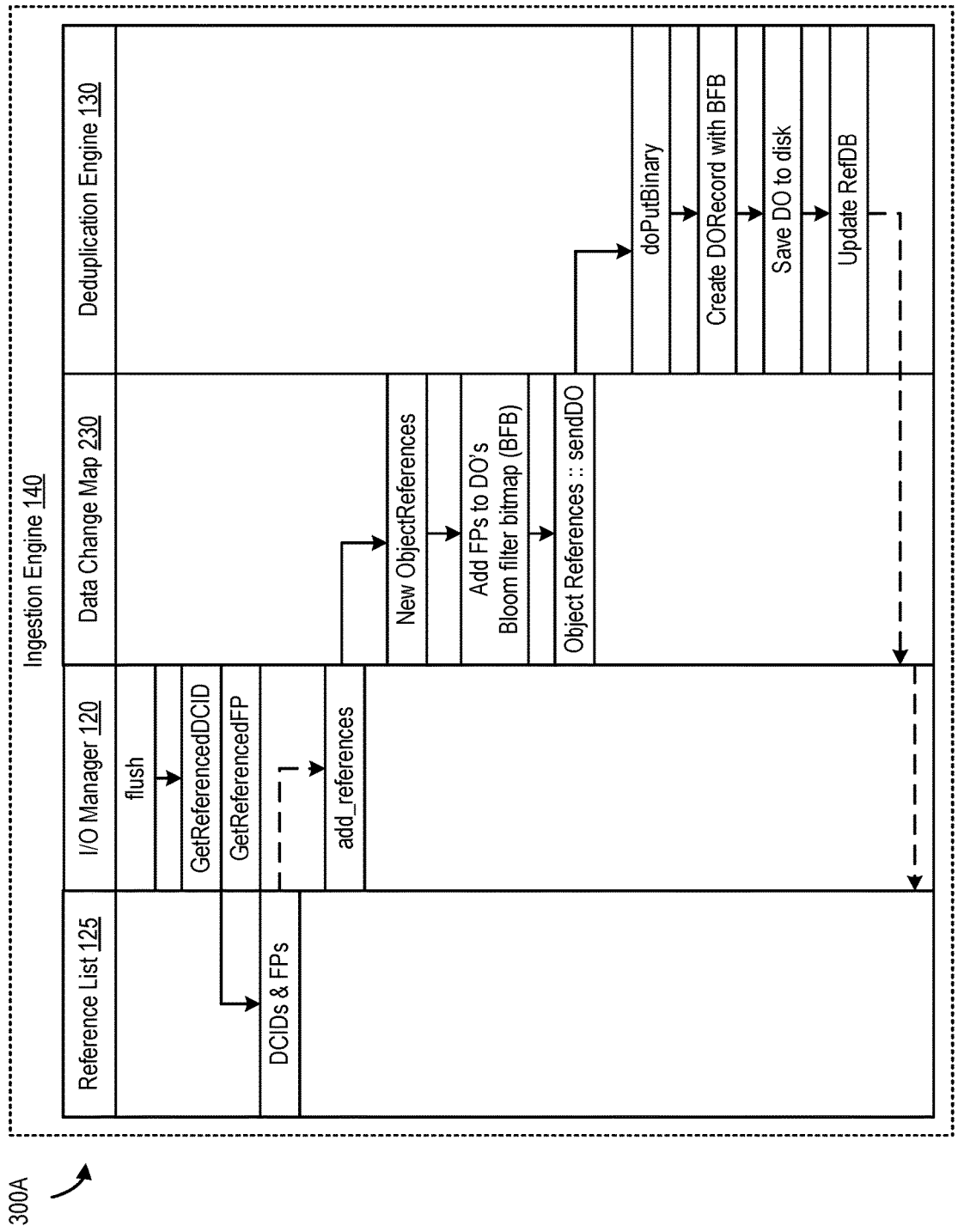
FIG. 3A is a block diagram 300A of an ingestion engine, according to one embodiment of the present disclosure.

FIG. 3A is a block diagram 300A of an ingestion engine, according to one embodiment. I/O manager 120 requests and receives a referenced data container identifier and fingerprints (e.g., DCIDs and FPs as shown in FIG. 2A) from reference list 125. I/O manager adds these identification references to a data change map 230 (e.g., mapping structure 235 of FIG. 2H). Data change map 230 then receives new object references (e.g., references to new segment objects), and adds segment object fingerprints (e.g., SOFPs) to one or more Bloom filter bitmaps of one or more data objects. Each data object can have its own Bloom filter bitmap. The data object is deduplicated by deduplication engine 130. Deduplication engine 130 creates a data object record with the Bloom filter bitmap (e.g., probabilistic data structure 165) saves the data object do disk (e.g., storage device 180), and updates reference database 160.

Figure 3B:
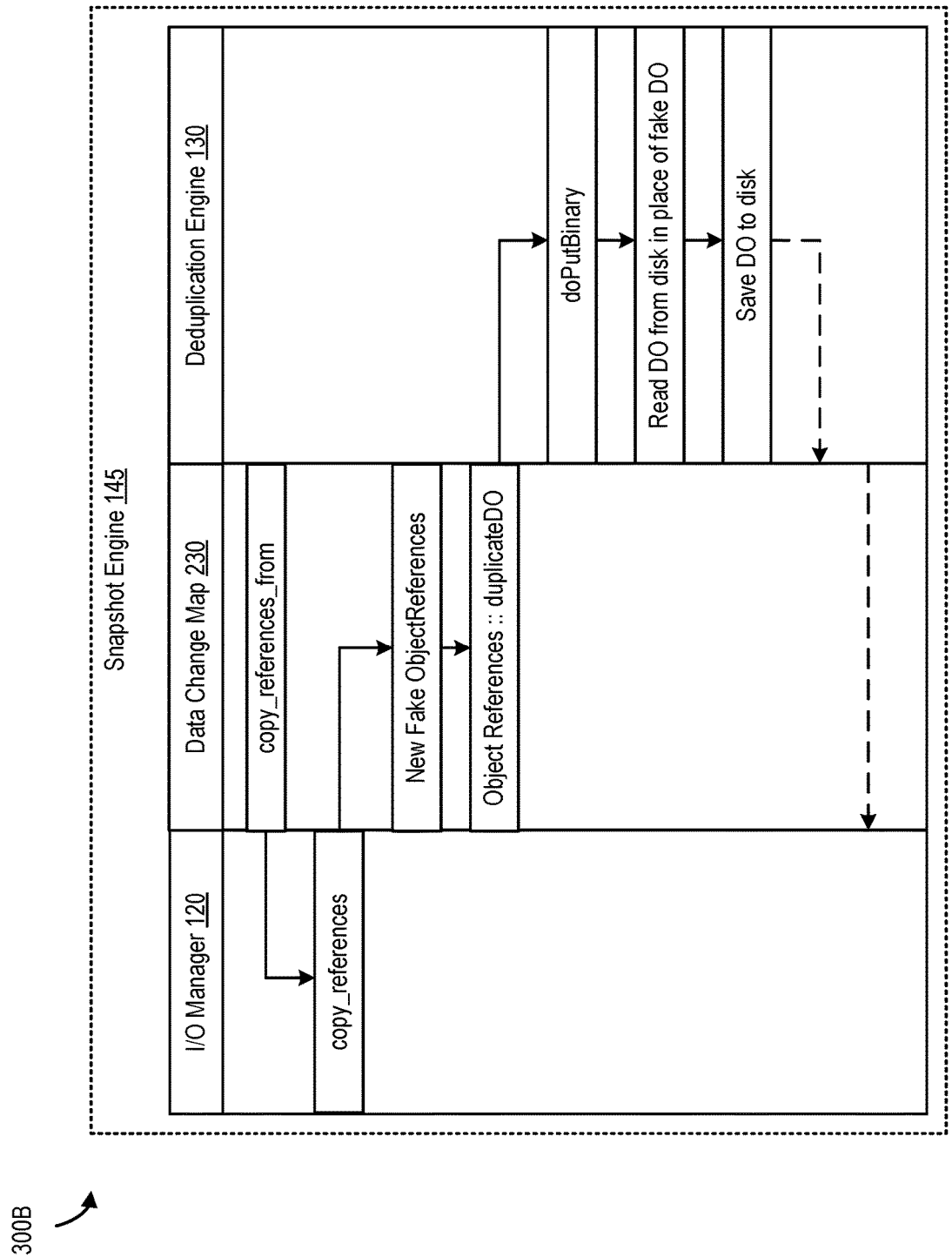
FIG. 3B is a block diagram 300B of a snapshot engine, according to one embodiment of the present disclosure.

FIG. 3B is a block diagram 300B of a snapshot engine, according to one embodiment. Data change map 230 copies references from reference list 125 in I/O manager 120 and determines if there are any new fake object references (e.g., whether there are any duplicate or redundant data objects). If the segment object fingerprint (e.g., one or more portions of a hash value) indicates a duplicate data object, deduplication engine 130 reads the data object from disk in place of the fake data object (e.g., a stale date object) and saves the data object (e.g., an updated and/or modified data object) to disk (e.g., storage device 190). In some embodiments, reference database 160 and a Lightening Memory-Mapped Database (LMDB) are stored on separate volumes on storage device 190 to avoid a race condition.

Figure 3C:
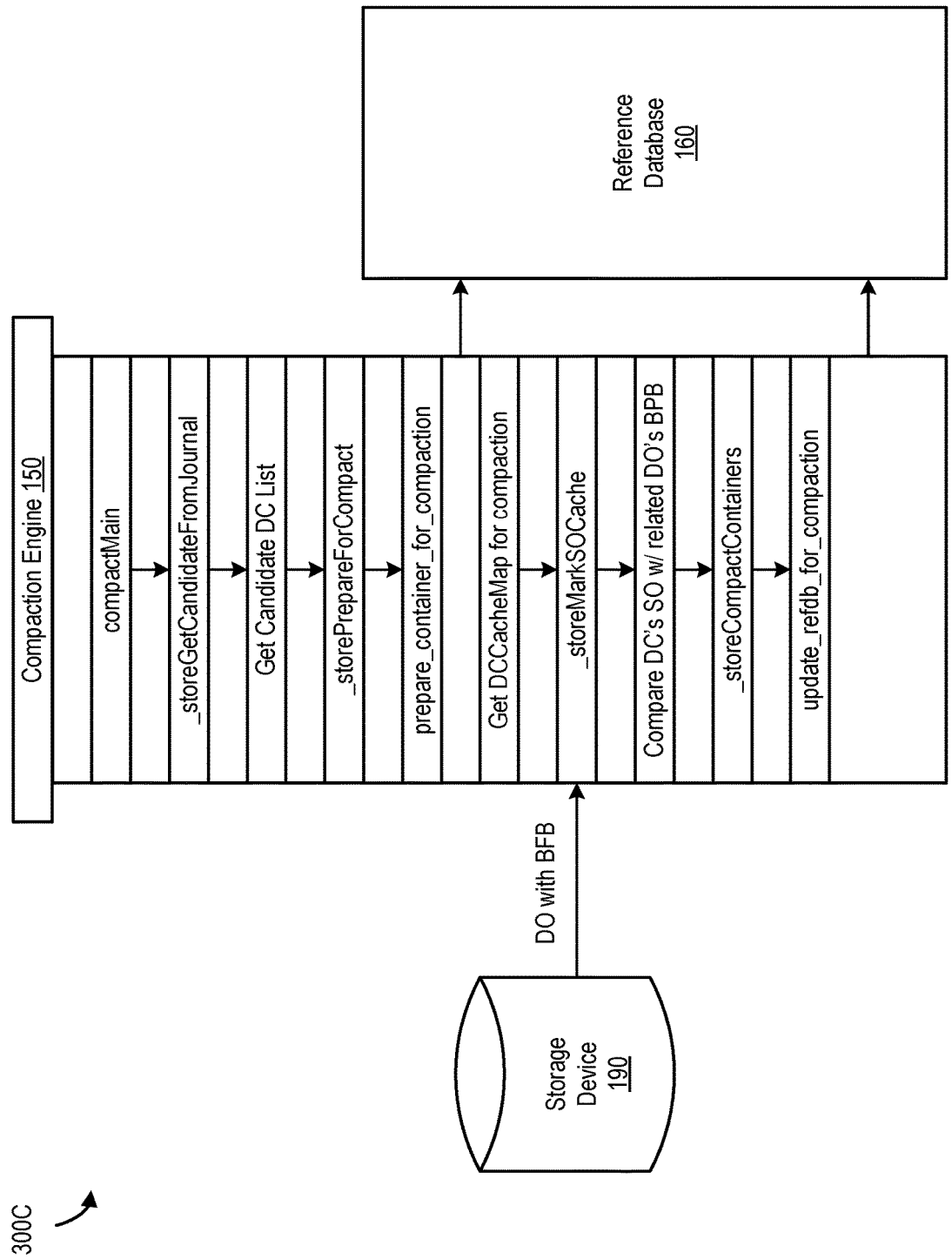
FIG. 3C is a block diagram 300C of a compaction engine, according to one embodiment of the present disclosure.

FIG. 3C is a block diagram 300C of a compaction engine, according to one embodiment. Compaction engine 150 can perform one or more compaction operations at least by retrieving a candidate data container list, preparing a container for compaction, retrieving or receiving a data change map (e.g., mapping structure 235) for compaction, comparing the data container's segment objects (e.g., a segment object's SOFP) with the one or more data objects' Bloom filter bitmap (e.g., probabilistic data structure 165), storing the compacted container, and updating the reference database (e.g., reference database 160).

Examples of Calculating and Adjusting the Size of Probabilistic Data Structures

FIG. 3D is a block diagram 300D of a probabilistic data structure size calculator, according to one embodiment. Probabilistic data structure size calculator 305 includes at least the following fields: file size 310, probabilistic data structure size 315, hash functions 320, hit ratio % 325, and deletion efficiency 330. As shown in FIG. 3D, a 512 MB file, which is relatively small, requires a segment object list that is 32 MB. However, a 128 GB file requires a 8 GB segment object list for compaction purposes. In some embodiments, if probabilistic data structure 165 is used instead of segment object list 215, the probabilistic data structure is only 1 MB (versus the segment object list's size of 8 GB). Similarly, in other embodiments, for a 1 TB file, a corresponding probabilistic data structure size is only 8 MB (versus the segment object list's size of 64 GB, and for a 16 TB file, the corresponding probabilistic data structure size is only 128 MB (versus the segment object's list size of 1 TB).

Because probabilistic data structure 165 results in false positives, the false positive rate can be calculated based on the size of the probabilistic data structure, the hash function count, and the fingerprint/bit size. A larger probabilistic data structure, higher number of hash functions used, and a larger fingerprint/bit size would result in fewer false positives. However, in some embodiments, these factors are measured and adjusted based on a hit ratio % and a deletion efficient threshold. A hit ratio percentage is the ratio of SOs that are correctly determined to be represented in probabilistic data structure 165 versus those SOs that are incorrectly determined to be represented in probabilistic data structure 165.

The deletion efficient threshold refers to whether valid data is not being maintained beyond a certain acceptable threshold. As shown in FIG. 3D, files that are 128 GB, 1 TB, and 16 TB and would require segment object lists that are 8 GB, 64 GB, and 1 TB, respectively, using probabilistic data structure 165 instead of segment object list 215 results in a probabilistic data structure whose size is only 1 MB, 8 MB, and 128 MB respectively. In this example, the hash function count associated with the probabilistic data structure is 7 and the fingerprint/bit size is 8. These example values result in a hit ratio percentage that is 97% and a false negative of 0. In other words, 97% of valid/required segment objects can be maintained during compaction if the foregoing specifications are used to determine the size of the probabilistic data structure, the number of hash functions, and the size of hash values.

Processes to Reclaim Containers Using Probabilistic Data Structures

Figure 4:
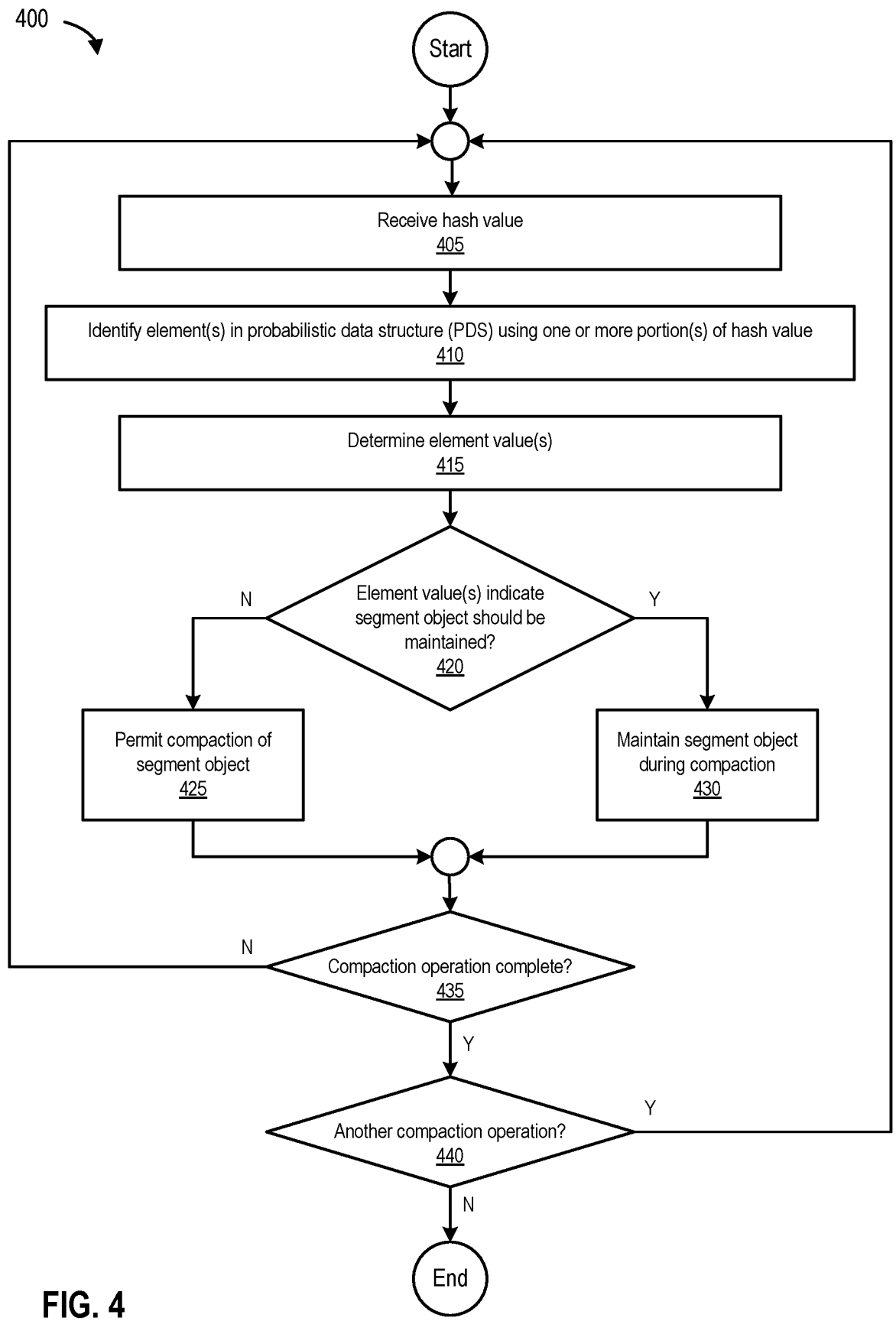
FIG. 4 is a flowchart 400 of a process for performing a compaction operation using a probabilistic data structure, according to one embodiment of the present disclosure.

FIG. 4 is a flowchart 400 of a process for performing a compaction operation using a probabilistic data structure, according to one embodiment. The process begins at 405 by receiving a hash value (e.g., segment object fingerprint). At 410, the process identifies elements (e.g., bit values) in a probabilistic data structure using one or more portion(s) of the hash value (e.g., hash function counts). At 415, the process determines the element values (e.g., whether the relevant bit positions are 0 or 1).

At 420, the process determines whether the element value(s) indicates that the segment object (that corresponds to the SOFP used to traverse the probabilistic data structure) should be maintained (e.g., whether at least one bit value associated with the segment object and identified by the segment object's SOFP is 0). If the segment object is not to be maintained, the process, at 425, permits compaction of the segment object, and if the segment object is to be maintained, the process, at 430, maintains the segment object during compaction. At 435, the process determines whether the compaction operation is complete. If the compaction operation is incomplete, the process loops to 405. Otherwise, at 440, the process determines if there is another compaction operation. If there is another compaction operation, the process loops to 405. Otherwise, the process ends.

Figure 5:
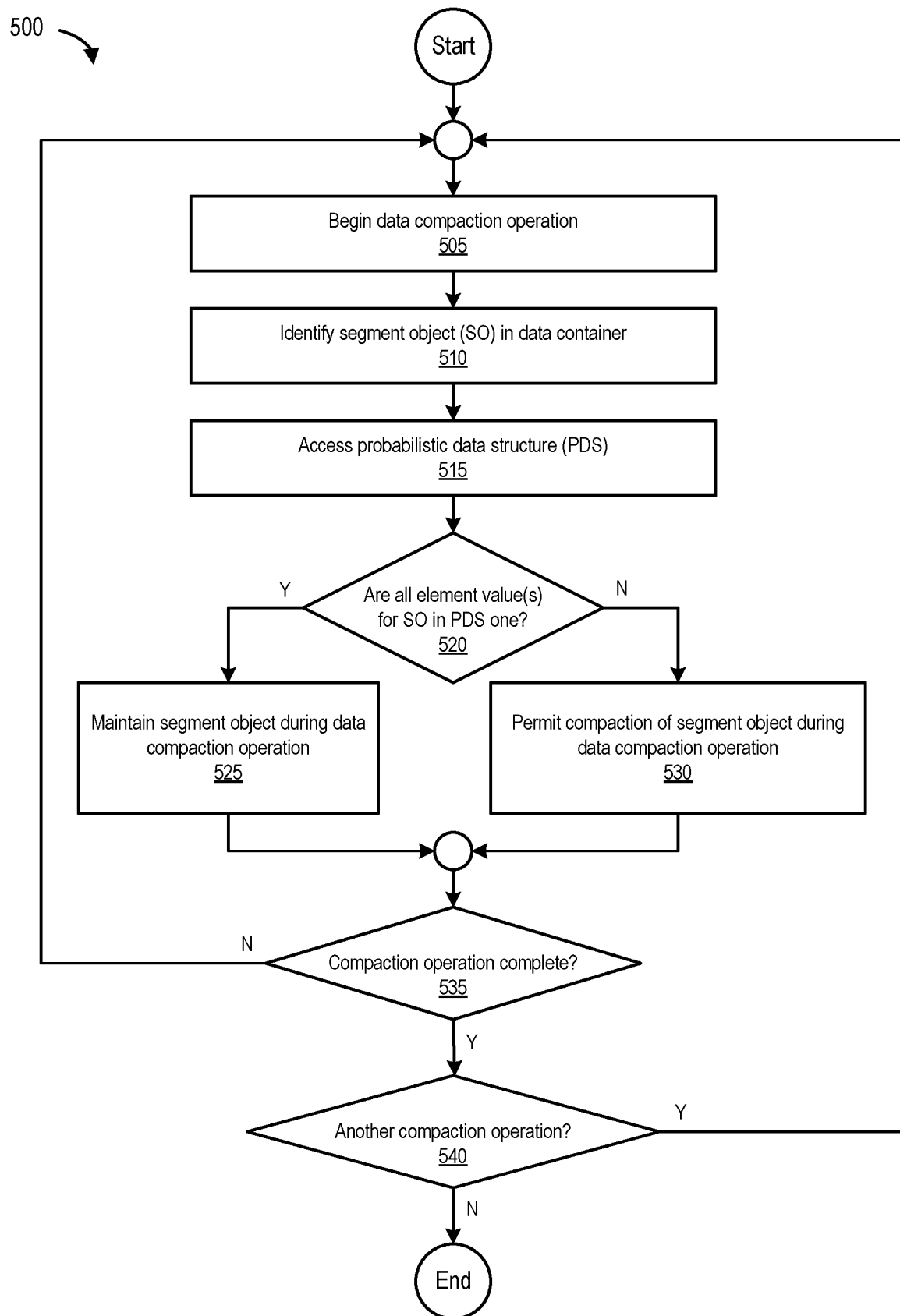
FIG. 5 is a flowchart 500 of a process for performing a compaction operation using a probabilistic data structure, according to one embodiment of the present disclosure.

FIG. 5 is a flowchart 500 of a process for performing a compaction operation using a probabilistic data structure, according to one embodiment. The process begins at 505 by beginning or starting a data compaction operation. At 510, the process identifies a segment object in a data container (e.g., SO 175(1) in data container 170 as shown in FIG. 2H). At 515, the process access a probabilistic data structure (e.g., probabilistic data structure 165, a Bloom filter bitmap, or some other comparable probabilistic data structure). At 520, the process determines whether all element value(s) (e.g., bit values as shown in FIG. 2G) for the (identified) segment object are 1 (e.g., whether at least one bit value is 0).

If every element value for the segment object is 1, the process, at 525, maintains the segment object during the data compaction operation. However, even if one (a single) element value for the segment object is 0, the process, at 530, permits compaction of the segment object during the data compaction operation. At 535, the process determines whether the compaction operation is complete. If the compaction operation is incomplete, the process loops to 505. Otherwise, at 540, the process determines if there is another compaction operation. If there is another compaction operation, the process loops to 505. Otherwise, the process ends.

Figure 6:
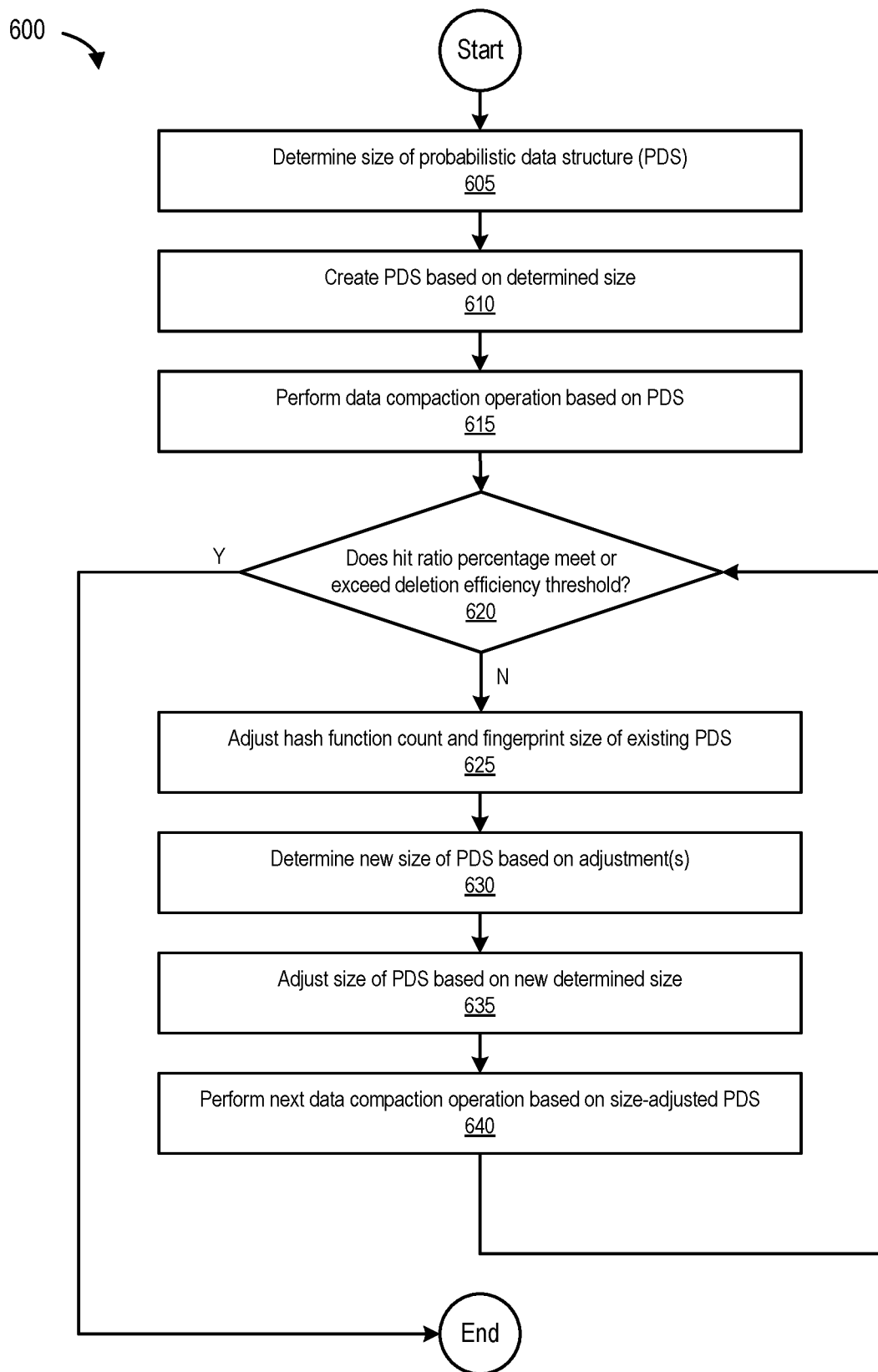
FIG. 6 is a flowchart 600 of a process for adjusting a size of a probabilistic data sturcture, according to one embodiment of the present disclosure.

FIG. 6 is a flowchart 600 of a process for adjusting a size of a probabilistic data sturucture, according to one embodiment. The process begins at 605 by determining the size of a probabilistic data structure (e.g., based on previous and/or historical hit ratio % or deletion efficiency). At 610, the process creates the probabilistic data structure based on the determined size (including hash function count and fingerprint/bit size). At 615, the process performs a data compaction based on the probabilistic data structure. At 620, the process determines whether a (current) hit ratio % meets or exceeds a deletion efficiency threshold. If the hit ratio % meets or exceeds the deletion efficiency threshold, the process ends. However, if the hit ratio % does not meet or exceed the deletion efficiency threshold, the process, at 625, adjusts (e.g., increases or decreases) the hash function count (e.g., from 7 portions to 8 or 9 portions) and fingerprint/bit size (e.g., from 8 bits to 16 bits) of the existing probabilistic data sturucture. For example, a larger probabilistic data sturucture, a higher hash function count, and a bigger fingerprint size would likely result in a higher hit ratio %, and vice-versa.

At 630, the process determines the new size of the probabilistic data sturucture based on the adjustment(s). At 635, the process adjusts the size of the probabilistic data sturucture based on the new determined sized, and at 640, performs the next data compaction operation based on the size-adjusted probabilistic data sturucture. It will be appreciated that the size of the probabilistic data sturucture can be continually adjusted until the hit ratio % meets or exceeds the deletion efficiency threshold.

Figure 7:
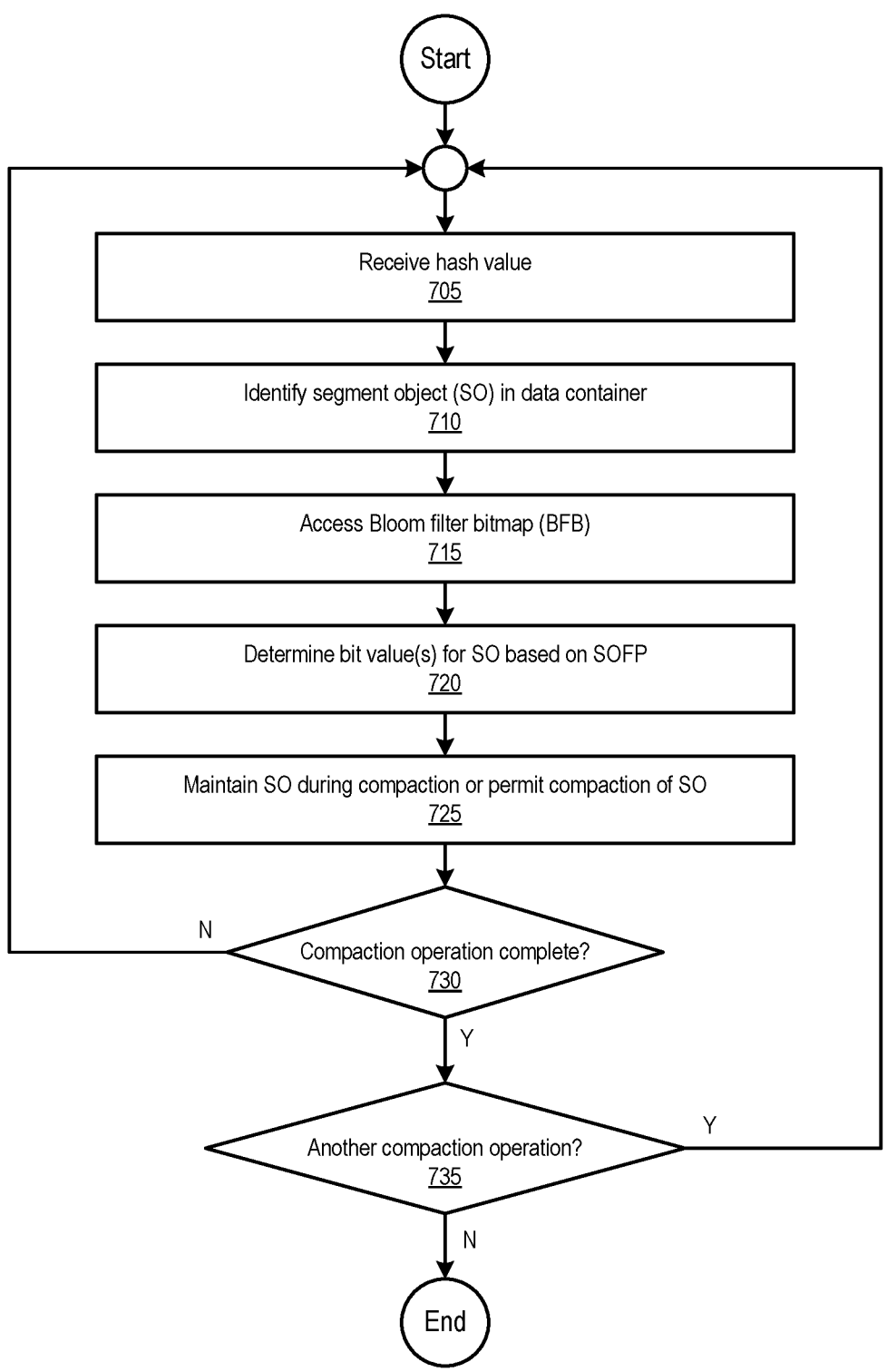
FIG. 7 is a flowchart 700 of a process for performing a compaction operation using a probabilistic data structure, according to one embodiment of the present disclosure.

FIG. 7 is a flowchart 700 of a process for performing a compaction operation using a probabilistic data structure, according to one embodiment. The process beings at 705 by receiving a hash value (e.g., a SOFP). At 710, the process identifies a segment object in a data container (e.g., a segment object that corresponds to the received SOFP/hash value). At 715, the process accesses a Bloom filter bitmap (e.g., probabilistic data sturucture 165). At 720, the process determines whether bit value(s) for the segment object based on the hash value (or one or more portions of the hash value). At 725, the process maintains the segment object during compaction if every bit value for the segment object is 1 or permits compaction of the segment object is even one bit value for the segment object is 0. At 730, the process determines whether the compaction operation is complete. If the compaction operation is incomplete, the process loops to 705. Otherwise, at 735, the process determines if there is another compaction operation. If there is another compaction operation, the process loops to 705. Otherwise, the process ends.

It will be appreciated that the probability of false positives (e.g., having to maintain segment object fingerprints (e.g., SOFPs) that don't have to or need to be maintained) can be controlled at least by: (1) the number (#) of hashes (e.g., hash values) per segment object (e.g., SO), and/or the number (#) of bit positions. It will also be appreciated that the methods, systems, and processes disclosed herein at least: (1) load the requisite identifying information from a storage device faster than existing and previous compaction mechanisms, (2) decrease memory footprint by using a probabilistic data structure for storage reclamation, (3) reduce storage space usage on disk, and/or (4) permit reuse of a segment object fingerprint value as a hash value for the probabilistic data structure.

Example Computing Environment

Figure 8:
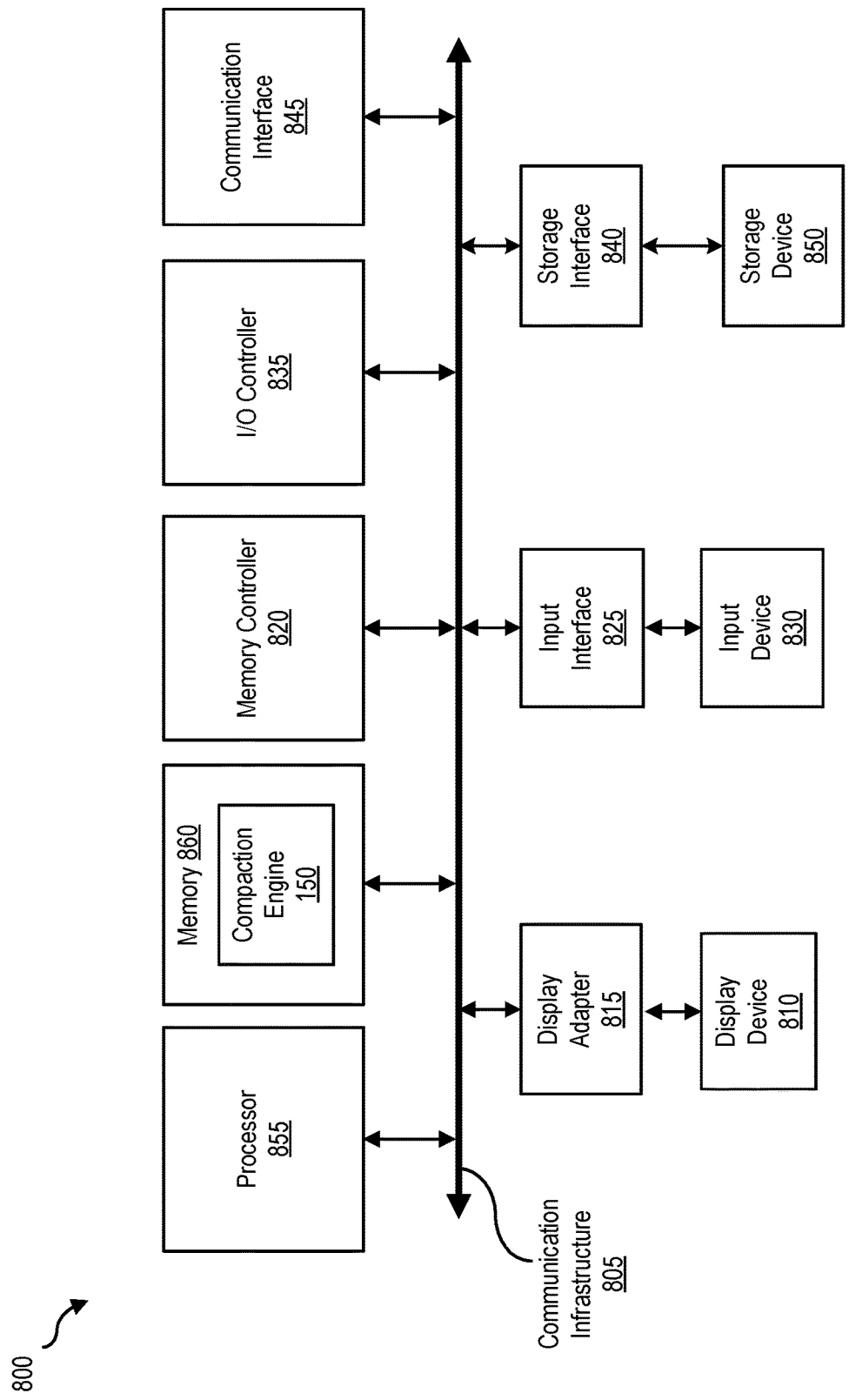
FIG. 8 is a block diagram of a computing system 800 that performs compaction using probabilistic data structures, according to one embodiment of the present disclosure.

FIG. 8 is a block diagram of a computing system 800 that performs compaction using probabilistic data structures, according to one embodiment. Computing system 800 can include computing device 105, and broadly represents any single or multi-processor computing device or system capable of executing computer-readable instructions. Examples of computing system 800 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 800 may include at least one processor 855 (e.g., like processor 110 as shown in FIG. 1) and a memory 860 (e.g., like memory 115 as shown in FIG. 1). By executing the software that executes compaction engine 150, computing system 800 becomes a special purpose computing device that is configured to perform container reclamation using probabilistic data structures.

Processor 855 generally represents any type or form of processing unit capable of processing data or interpreting and executing instructions. In certain embodiments, processor 855 may receive instructions from a software application or module. These instructions may cause processor 855 to perform the functions of one or more of the embodiments described and/or illustrated herein. For example, processor 855 may perform and/or be a means for performing all or some of the operations described herein. Processor 855 may also perform and/or be a means for performing any other operations, methods, or processes described and/or illustrated herein. Memory 860 generally represents any type or form of volatile or non-volatile storage devices or mediums capable of storing data and/or other computer-readable instructions. Examples include, without limitation, random access memory (RAM), read only memory (ROM), flash memory, or any other suitable memory device. Although not required, in certain embodiments computing system 800 may include both a volatile memory unit and a non-volatile storage device. In one example, program instructions implementing compaction engine 150 may be loaded into memory 860.

In certain embodiments, computing system 800 may also include one or more components or elements in addition to processor 855 and/or memory 860. For example, as illustrated in FIG. 8, computing system 800 may include a memory controller 820, an Input/Output (I/O) controller 835, and a communication interface 845, each of which may be interconnected via a communication infrastructure 805. Communication infrastructure 805 generally represents any type or form of infrastructure capable of facilitating communication between one or more components of a computing device. Examples of communication infrastructure 805 include, without limitation, a communication bus (such as an Industry Standard Architecture (ISA), Peripheral Component Interconnect (PCI), PCI express (PCIe), or similar bus) and a network.

Memory controller 820 generally represents any type/form of device capable of handling memory or data or controlling communication between one or more components of computing system 800. In certain embodiments memory controller 820 may control communication between processor 855, memory 860, and I/O controller 835 via communication infrastructure 805. In certain embodiments, memory controller 820 may perform and/or be a means for performing, either alone or in combination with other elements, one or more of the operations or features described and/or illustrated herein.

I/O controller 835 generally represents any type or form of module capable of coordinating and/or controlling the input and output functions of an appliance and/or a computing device. For example, in certain embodiments I/O controller 835 may control or facilitate transfer of data between one or more elements of computing system 800, such as processor 855, memory 860, communication interface 845, display adapter 815, input interface 825, and storage interface 840.

Communication interface 845 broadly represents any type or form of communication device or adapter capable of facilitating communication between computing system 800 and one or more other devices. Communication interface 845 may facilitate communication between computing system 800 and a private or public network including additional computing systems. Examples of communication interface 845 include, without limitation, a wired network interface (such as a network interface card), a wireless network interface (such as a wireless network interface card), a modem, and any other suitable interface. Communication interface 845 may provide a direct connection to a remote server via a direct link to a network, such as the Internet, and may also indirectly provide such a connection through, for example, a local area network (e.g., an Ethernet network), a personal area network, a telephone or cable network, a cellular telephone connection, a satellite data connection, or any other suitable connection.

Communication interface 845 may also represent a host adapter configured to facilitate communication between computing system 800 and one or more additional network or storage devices via an external bus or communications channel. Examples of host adapters include, Small Computer System Interface (SCSI) host adapters, Universal Serial Bus (USB) host adapters, Institute of Electrical and Electronics Engineers (IEEE) 1394 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like. Communication interface 845 may also allow computing system 800 to engage in distributed or remote computing (e.g., by receiving/sending instructions to/from a remote device for execution).

As illustrated in FIG. 8, computing system 800 may also include at least one display device 810 coupled to communication infrastructure 805 via a display adapter 815. Display device 810 generally represents any type or form of device capable of visually displaying information forwarded by display adapter 815. Similarly, display adapter 815 generally represents any type or form of device configured to forward graphics, text, and other data from communication infrastructure 805 (or from a frame buffer, as known in the art) for display on display device 810. Computing system 800 may also include at least one input device 830 coupled to communication infrastructure 805 via an input interface 825. Input device 830 generally represents any type or form of input device capable of providing input, either computer or human generated, to computing system 800. Examples of input device 830 include a keyboard, a pointing device, a speech recognition device, or any other input device.

Computing system 800 may also include storage device 850 (e.g., like storage device 190 as shown in FIG. 1) coupled to communication infrastructure 805 via a storage interface 840. Storage device 850 generally represents any type or form of storage devices or mediums capable of storing data and/or other computer-readable instructions. For example, storage device 850 may include a magnetic disk drive (e.g., a so-called hard drive), a floppy disk drive, a magnetic tape drive, an optical disk drive, a flash drive, or the like. Storage interface 840 generally represents any type or form of interface or device for transferring and/or transmitting data between storage device 850, and other components of computing system 800. Storage device 850 may be configured to read from and/or write to a removable storage unit configured to store computer software, data, or other computer-readable information. Examples of suitable removable storage units include a floppy disk, a magnetic tape, an optical disk, a flash memory device, or the like. Storage device 850 may also include other similar structures or devices for allowing computer software, data, or other computer-readable instructions to be loaded into computing system 800. For example, storage device 850 may be configured to read and write software, data, or other computer-readable information. Storage device 850 may also be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from that shown in FIG. 8. Computing system 800 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 800 for storage in memory via a network such as the Internet or upon a carrier medium.

The computer-readable medium containing the computer program may be loaded into computing system 800. All or a portion of the computer program stored on the computer-readable medium may then be stored in memory 860 (e.g., memory 115), and/or various portions of storage device 850 (e.g., storage device 190). When executed by processor 855 (e.g., processor 110), a computer program loaded into computing system 800 (e.g., computing device 105) may cause processor 855 to perform and/or be a means for performing the functions of one or more of the embodiments described and/or illustrated herein. Additionally or alternatively, one or more of the embodiments described and/or illustrated herein may be implemented in firmware and/or hardware. For example, computing system 800 may be configured as an application specific integrated circuit (ASIC) adapted to implement one or more of the embodiments disclosed herein.

Example Networking Environment

Figure 9:
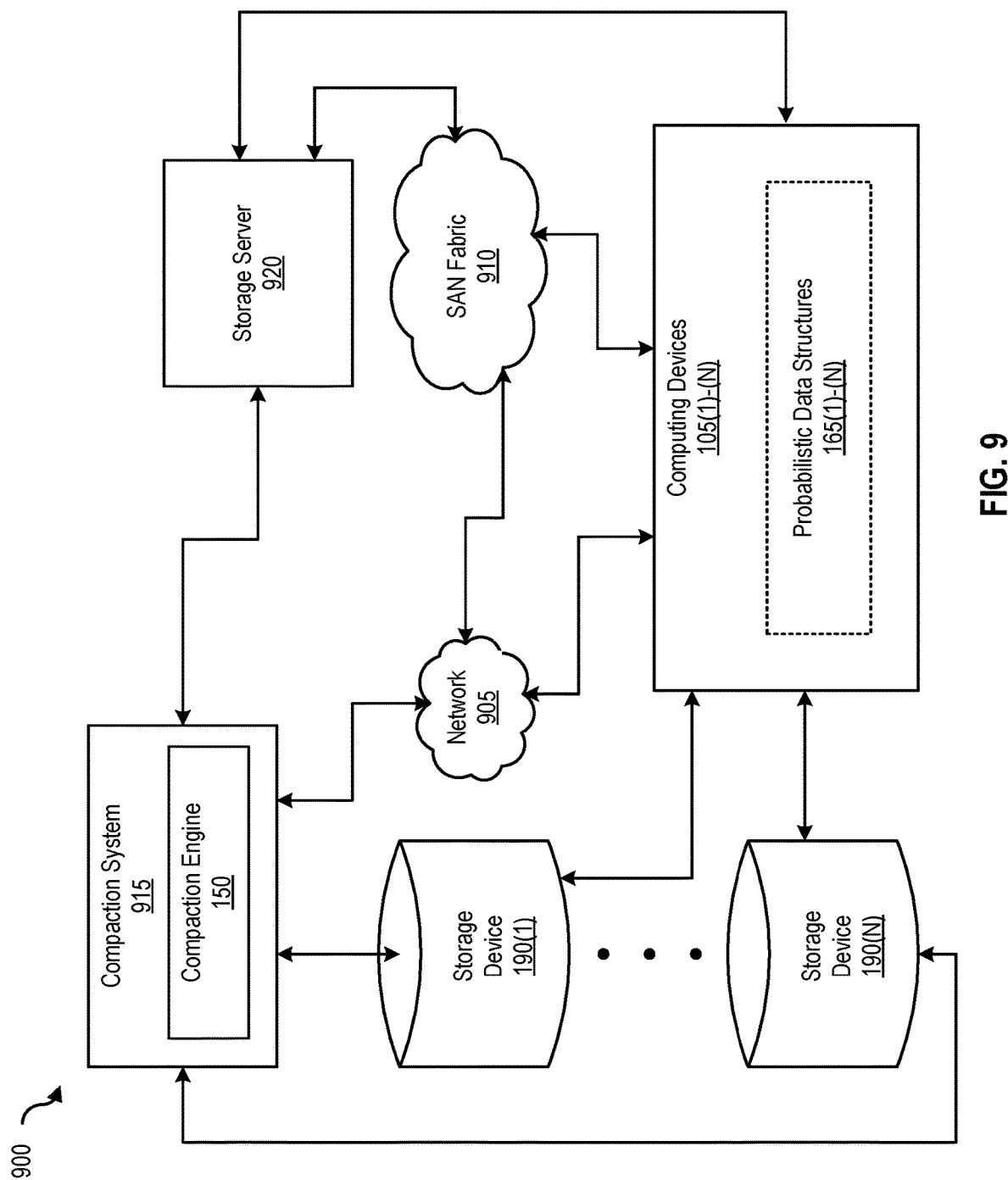
FIG. 9 is a block diagram of a networking system 900, according to one embodiment of the present disclosure.

FIG. 9 is a block diagram of a networking system 900, according to one embodiment of the present disclosure. In certain embodiments, network-attached storage (NAS) devices may be configured to communicate between computing devices 105(1)-(N), and/or compaction system 915 using various protocols, such as Network File System (NFS), Server Message Block (SMB), or Common Internet File System (CIFS). Network 905 generally represents any type or form of computer network or architecture capable of facilitating communication between computing device 10 (1)-(N), storage devices 190(1)-(N), and/or compaction system 915.

In certain embodiments, a communication interface, such as communication interface 845 in FIG. 8, may be used to provide connectivity between computing device 105 (1)-(N), storage devices 190 (1)-(N), and/or compaction system 915, and network 905. The embodiments described and/or illustrated herein are not limited to the Internet or any particular network-based environment. For example, network 905 can be a Storage Area Network (SAN). In some embodiments, compaction system 915 may be part of computing devices 105(1)-(N), or may be separate. If separate, compaction system 915 and computing devices 105(1)-(N) may be communicatively coupled via network 905.

In one embodiment, all or a portion of one or more of the disclosed embodiments may be encoded as a computer program and loaded onto and executed by computing devices 105(1)-(N), and/or compaction system 915, or any combination thereof. All or a portion of one or more of the embodiments disclosed herein may also be encoded as a computer program, stored on computing device 105(1)-(N), storage devices 190(1)-(N), and/or compaction system 915, and distributed over network 905.

In some examples, all or a portion of computing device 105(1)-(N), storage devices 190(1)-(N), and/or compaction system 915 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface.

Various functions described herein may be provided through a remote desktop environment or any other cloud-based computing environment. In addition, one or more of the components described herein may transform data, physical devices, and/or representations of physical devices from one form to another. For example, compaction engine 150 may transform the behavior of computing device 105 in order to cause computing device 105 and storage device 190 to perform container reclamation using probabilistic data structures.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A method comprising:
   receiving a hash value, wherein
      the hash value is a result of performing a hash function on data of a segment object, and
      the segment object is stored in a data container;
   identifying one or more elements in a probabilistic data structure, wherein
      the identifying is performed using at least a portion of the hash value;
   determining an element value for each of the one or more elements;
   determining whether one or more element values indicate that the segment object should be maintained during compaction of the data container, wherein
      the one or more element values indicate that the segment object should be maintained during compaction of the data container by returning a true value,
      the one or more element values indicate that the segment object should not be maintained during compaction of the data container by returning a false value,
      a first probability of the false value being returned for the segment object that should be maintained during compaction of the data container is zero, and
      a second probability of the true value being returned for the segment object that should be maintained during compaction of the data container is, at least in part, a function of a size of the probabilistic data structure, a size of the hash value, and a uniqueness of the hash value; and
   in response to a determination that the one of more element values indicate that the segment object should be maintained during compaction of the data container;
   maintaining the segment object during compaction of the data container.

2. The method of claim 1, wherein
the compaction of the data container comprises
   maintaining another segment object during the compacting if the element value for each of the one or more elements in the probabilistic data structure is one, and
   permitting compaction of the another segment object during the compacting if the element value for at least one element of the one or more elements is zero.

3. The method of claim 1, further comprising:
determining a size of the probabilistic data structure, wherein
   the size of the probabilistic data structure is based on determining that the portion of the hash value results in a false positive rate associated with the segment object, and
   the false positive rate indicates that a hit ratio percentage meets or exceeds a deletion efficiency threshold.

4. The method of claim 3, further comprising:
creating the probabilistic data structure prior to compaction of the data container, wherein
   the creating the probabilistic data structure comprises
      accessing the portion of the hash value, and
      setting one or more bit values that the portion of the hash value indicates in the probabilistic data structure.

5. The method of claim 4, further comprising:
determining a false positive rate associated with the probabilistic data structure, wherein
   the false positive rate is a function of the size of the probabilistic data structure, a hash function count, and a fingerprint size; and
determining a false negative rate associated with the probabilistic data structure, wherein
   the hit ratio percentage meets or exceeds the deletion efficiency threshold if the false negative rate is zero.

6. The method of claim 1, wherein
the segment object is comprised in a data object, and
the probabilistic data structure is associated with the data object.

7. The method of claim 1, wherein
the probabilistic data structure is a Bloom filter bitmap.

8. A non-transitory computer readable storage medium comprising program instructions executable to:
   receive a hash value, wherein
      the hash value is a result of performing a hash function on data of a segment object, and
      the segment object is stored in a data container;
   identify one or more elements in a probabilistic data structure, wherein the program instructions executable to identify use at least a portion of the hash value;
   determining an element value for each of the one or more elements;
   determining whether one or more element values indicate that the segment object should be maintained during compaction of the data container, wherein
      the one or more element values indicate that the segment object should be maintained during compaction of the data container by returning a true value,
      the one or more element values indicate that the segment object should not be maintained during compaction of the data container by returning a false value,
      a first probability of the false value being returned for the segment object that should be maintained during compaction of the data container is zero, and
      a second probability of the true value being returned for the segment object that should be maintained during compaction of the data container is, at least in part, a function of a size of the probabilistic data structure, a size of the hash value, and a uniqueness of the hash value; and
   in response to a determination that the one of more element values indicate that the segment object should be maintained during compaction of the data container; and
   in response to a determination that the one of more element values indicate that the segment object should be maintained,
      maintain the segment object during compaction of the data container.

9. The non-transitory computer readable storage medium of claim 8, wherein the compaction of the data container comprises
   maintaining another segment object during the compacting if the element value for each of the one or more elements in the probabilistic data structure is one, and
   permitting compaction of the another segment object during the compacting if the element value for at least one element of the one or more elements is zero.

10. The non-transitory computer readable storage medium of claim 8, further comprising:
   determining a size of the probabilistic data structure, wherein the size of the probabilistic data structure is based on determining that the portion of the hash value results in a false positive rate associated with the segment object, and the false positive rate indicates that a hit ratio percentage meets or exceeds a deletion efficiency threshold.

11. The non-transitory computer readable storage medium of claim 10, further comprising:

creating the probabilistic data structure prior to compaction of the data container, wherein the creating the probabilistic data structure comprises accessing the portion of the hash value, and setting one or more bit values that the portion of the hash value indicates in the probabilistic data structure.

12. The non-transitory computer readable storage medium of claim 11, further comprising:

determining a false positive rate associated with the probabilistic data structure, wherein the false positive rate is a function of the size of the probabilistic data structure, a hash function count, and a fingerprint size; and determining a false negative rate associated with the probabilistic data structure, wherein the hit ratio percentage meets or exceeds the deletion efficiency threshold if the false negative rate is zero.

13. The non-transitory computer readable storage medium of claim 8, wherein the segment object is comprised in a data object, and
the probabilistic data structure is associated with the data object.

14. The non-transitory computer readable storage medium of claim 8, wherein the probabilistic data structure is a Bloom filter bitmap.

15. A system comprising:

one or more processors; and a memory coupled to the one or more processors, wherein the memory stores program instructions executable by the one or more processors to receive a hash value, wherein the hash value a result of performing a hash function on data of a segment object, and the segment object is stored in a data container, identify one or more elements in a probabilistic data structure, wherein the program instructions executable by the one or more processors to identify use at least a portion of the hash value;

determining an element value for each of the one or more elements, determining whether one or more element values indicate that the segment object should be maintained during compaction of the data container, wherein the one or more element values indicate that the segment object should be maintained during compaction of the data container by returning a true value, the one or more element values indicate that the segment object should not be maintained during compaction of the data container by returning a false value, a first probability of the false value being returned for the segment object that should be maintained during compaction of the data container is zero, and a second probability of the true value being returned for the segment object that should be maintained during compaction of the data container is, at least in part, a function of a size of the probabilistic data structure, a size of the hash value, and a uniqueness of the hash value, and in response to a determination that the one of more element values indicate that the segment object should be maintained during compaction of the data container, maintain the segment object during compaction of the data container.

16. The system of claim 15, wherein the compaction of the data container comprises maintaining another segment object during the compacting if the element value for each of the one or more elements in the probabilistic data structure is one, and permitting compaction of the another segment object during the compacting if the element value for at least one element of the one or more elements is zero.

17. The system of claim 15, further comprising:

determining a size of the probabilistic data structure, wherein the size of the probabilistic data structure is based on determining that the portion of the hash value results in a false positive rate associated with the segment object, and the false positive rate indicates that a hit ratio percentage meets or exceeds a deletion efficiency threshold.

18. The system of claim 17, further comprising:

creating the probabilistic data structure prior to compaction of the data container, wherein the creating the probabilistic data structure comprises accessing the portion of the hash value, and setting one or more bit values that the portion of the hash value indicates in the probabilistic data structure.

19. The system of claim 18, further comprising:

determining a false positive rate associated with the probabilistic data structure, wherein the false positive rate is a function of the size of the probabilistic data structure, a hash function count, and a fingerprint size; and determining a false negative rate associated with the probabilistic data structure, wherein the hit ratio percentage meets or exceeds the deletion efficiency threshold if the false negative rate is zero.

20. The system of claim 15, wherein the segment object is comprised in a data object,
the probabilistic data structure is associated with the data object, and
the probabilistic data structure is a Bloom filter bitmap.

* * * * *